(12) United States Patent
Akasaka

(10) Patent No.: US 12,036,740 B2
(45) Date of Patent: Jul. 16, 2024

(54) THREE-DIMENSIONAL SHAPING DEVICE AND METHOD FOR MANUFACTURING THREE-DIMENSIONAL SHAPED OBJECT

(71) Applicant: Seiko Epson Corporation, Tokyo (JP)

(72) Inventor: Tatsuo Akasaka, Azumino (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/583,299

(22) Filed: Jan. 25, 2022

(65) Prior Publication Data

US 2022/0234294 A1 Jul. 28, 2022

(30) Foreign Application Priority Data

Jan. 26, 2021 (JP) ................................ 2021-009951

(51) Int. Cl.
*B29C 64/35* (2017.01)
*B29C 64/118* (2017.01)
(Continued)

(52) U.S. Cl.
CPC ............ *B29C 64/35* (2017.08); *B29C 64/118* (2017.08); *B29C 64/209* (2017.08); *B29C 64/232* (2017.08); *B29C 64/236* (2017.08); *B29C 64/245* (2017.08); *B33Y 10/00* (2014.12); *B33Y 30/00* (2014.12); *B33Y 40/00* (2014.12)

(58) Field of Classification Search
CPC ......... B33Y 10/00; B33Y 30/00; B33Y 40/00; B41J 2/16517
See application file for complete search history.

(56) References Cited

U.S. PATENT DOCUMENTS 10,702,039 B2   7/2020  Shimizu
2007/0085876 A1  4/2007  Harper et al.
(Continued)

FOREIGN PATENT DOCUMENTS

CN   101678383 A   3/2010
CN   204974541 U   1/2016
(Continued)

OTHER PUBLICATIONS https://www.youtube.com/watch?v=mUeDcgkfJoQ V2: automatic hotend nozzle cleaner / brush (Year: 2015).*
TW-200932547-A Translation and Original (Year: 2009).*

*Primary Examiner* — Farah Taufiq
(74) *Attorney, Agent, or Firm* — Harness, Dickey & Pierce, P.L.C.

(57) ABSTRACT

A three-dimensional shaping device includes an injection head having a nozzle, a stage, a motor, a brush, a blade, a memory, and a processor. The processor is configured to execute a program so as to cause the nozzle to reciprocally move along a zigzag path in a cleaning operation such that the nozzle passes from a side of the blade toward a side of the brush and from the side of the brush toward the side of the blade several times to contact at least one of the brush and the blade at different positions several times. The brush and the blade are disposed at a height at which the brush and the blade contact with the nozzle. The brush and the blade have a melting point higher than a plasticizing temperature of the plasticizing material and have hardness lower than hardness of the nozzle.

18 Claims, 10 Drawing Sheets

(51) Int. Cl.
   *B29C 64/209* (2017.01)
   *B29C 64/232* (2017.01)
   *B29C 64/236* (2017.01)
   *B29C 64/245* (2017.01)
   *B33Y 10/00* (2015.01)
   *B33Y 30/00* (2015.01)
   *B33Y 40/00* (2020.01)

(56) References Cited

U.S. PATENT DOCUMENTS

| | | | |
|---|---|---|---|
| 2007/0134035 A1* | 6/2007 | Kageyama | G03G 21/0017 399/346 |
| 2008/0317894 A1* | 12/2008 | Turley | B29C 64/209 425/226 |
| 2009/0035405 A1 | 2/2009 | Leavitt | |
| 2012/0007932 A1 | 1/2012 | Yokoyama et al. | |
| 2013/0241102 A1 | 9/2013 | Rodgers et al. | |
| 2014/0125734 A1 | 5/2014 | Kobayashi | |
| 2015/0158254 A1* | 6/2015 | Chang | B05B 15/52 15/104.001 |
| 2015/0165694 A1 | 6/2015 | Lee et al. | |
| 2016/0176120 A1 | 6/2016 | Skubic et al. | |
| 2018/0001556 A1* | 1/2018 | Buller | B29C 64/371 |
| 2018/0117834 A1 | 5/2018 | Murao | |
| 2019/0134907 A1 | 5/2019 | Hoechsmann et al. | |
| 2020/0406548 A1* | 12/2020 | Yuwaki | B29C 64/106 |
| 2021/0178752 A1 | 6/2021 | Johnson et al. | |
| 2022/0134667 A1* | 5/2022 | Mansell | B29C 64/357 425/78 |
| 2022/0203617 A1* | 6/2022 | Pekic | B29C 64/40 |

FOREIGN PATENT DOCUMENTS

| | | | |
|---|---|---|---|
| CN | 111319367 A * | 6/2020 | B29C 64/135 |
| JP | 2006-192710 A | 7/2006 | |
| JP | 2010-530326 A | 9/2010 | |
| JP | 2010-535117 A | 11/2010 | |
| JP | 2015-112873 A | 6/2015 | |
| JP | 2018-075825 A | 5/2018 | |
| JP | 2020-069726 A | 5/2020 | |
| TW | 200932547 A * | 8/2009 | B41J 2/055 |
| WO | 2010-001897 A1 | 1/2010 | |
| WO | 2020-198881 A1 | 10/2020 | |

* cited by examiner

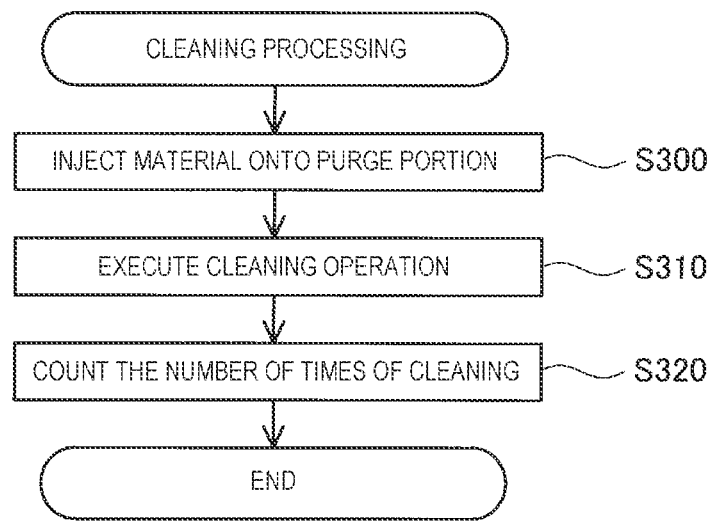
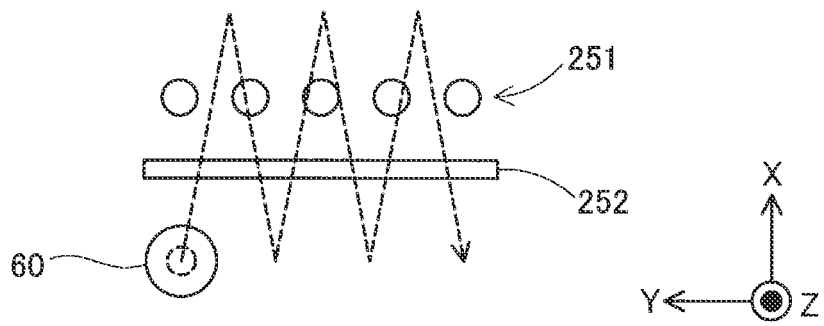
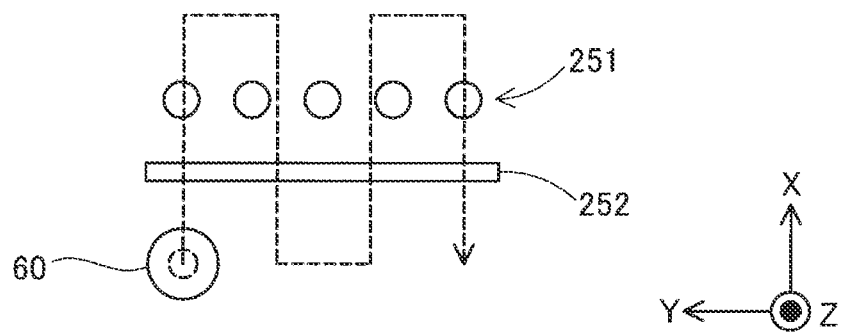

THREE-DIMENSIONAL SHAPING DEVICE AND METHOD FOR MANUFACTURING THREE-DIMENSIONAL SHAPED OBJECT

The present application is based on, and claims priority from JP Application Serial Number 2021-009951, filed Jan. 26, 2021, the disclosure of which is hereby incorporated by reference herein in its entirety.

BACKGROUND

1. Technical Field

The present disclosure relates to a three-dimensional shaping device and a method for manufacturing a three-dimensional shaped object.

2. Related Art

JP-T-2010-530326 discloses a three-dimensional shaping device including an end cleaning assembly which includes a flicker plate and a brush. In the three-dimensional shaping device, cleaning of an extrusion head is performed by bringing the extrusion head into contact with the flicker plate and the brush.

When the cleaning of the extrusion head is performed, the flicker plate and the brush are worn, so that the flicker plate and the brush may need to be replaced. Therefore, in the three-dimensional shaping device, there is a demand for a technique capable of preventing wear of a cleaning mechanism such as a flicker plate or a brush and reducing a frequency of replacement.

SUMMARY

According to a first aspect of the present disclosure, a three-dimensional shaping device is provided. The three-dimensional shaping device includes: an injection unit including a plasticizing mechanism configured to plasticize a plasticizing material to generate a shaping material and a nozzle, and configured to inject the shaping material from the nozzle; a stage on which the shaping material is to be stacked; a drive unit configured to change a relative position between the injection unit and the stage; a cleaning mechanism including a brush and a blade; and a control unit configured to execute a cleaning processing for cleaning the nozzle, in which the brush and the blade are disposed at a height at which the brush and the blade are able to come into contact with the nozzle, the brush and the blade have a melting point higher than a plasticizing temperature of the plasticizing material, and have hardness lower than hardness of the nozzle, in the cleaning processing, the control unit is configured to execute a cleaning operation of bringing at least one of the brush and the blade into contact with the nozzle by reciprocally moving the nozzle such that the nozzle cuts across the cleaning mechanism a plurality of times, and the control unit is configured to reciprocally move the nozzle such that the nozzle comes into contact with the brush or the blade at different positions in the cleaning operation.

According to a second aspect of the present disclosure, there is provided a method for manufacturing a three-dimensional shaped object in a three-dimensional shaping device, the three-dimensional shaping device including: an injection unit including a plasticizing mechanism configured to plasticize a plasticizing material to generate a shaping material and a nozzle, and configured to inject the shaping material from the nozzle; a stage on which the shaping material is to be stacked; a drive unit configured to change a relative position between the injection unit and the stage; and a cleaning mechanism including a brush and a blade, in which the brush and the blade are disposed at a height at which the brush and the blade are able to come into contact with the nozzle, and the brush and the blade have a melting point higher than a plasticizing temperature of the plasticizing material, and have hardness lower than hardness of the nozzle. This manufacturing method includes a shaping step of shaping a three-dimensional shaped object by injecting a shaping material from the injection unit to the stage; and a cleaning step of executing a cleaning operation of bringing at least one of the brush and the blade into contact with the nozzle by reciprocally moving the nozzle such that the nozzle cuts across the cleaning mechanism a plurality of times at any one timing of before the shaping step, during the shaping step and after the shaping step, in which in the cleaning step, the nozzle is reciprocally moved such that the nozzle comes into contact with the brush or the blade at different positions in the cleaning operation.

BRIEF DESCRIPTION OF THE DRAWINGS

FIG. 7 is a flowchart of a cleaning processing.

FIG. 8 is a diagram illustrating a cleaning operation.

FIG. 9 is a diagram illustrating another example of the cleaning operation.

DESCRIPTION OF EXEMPLARY EMBODIMENTS

A. First Embodiment

Figure 1:
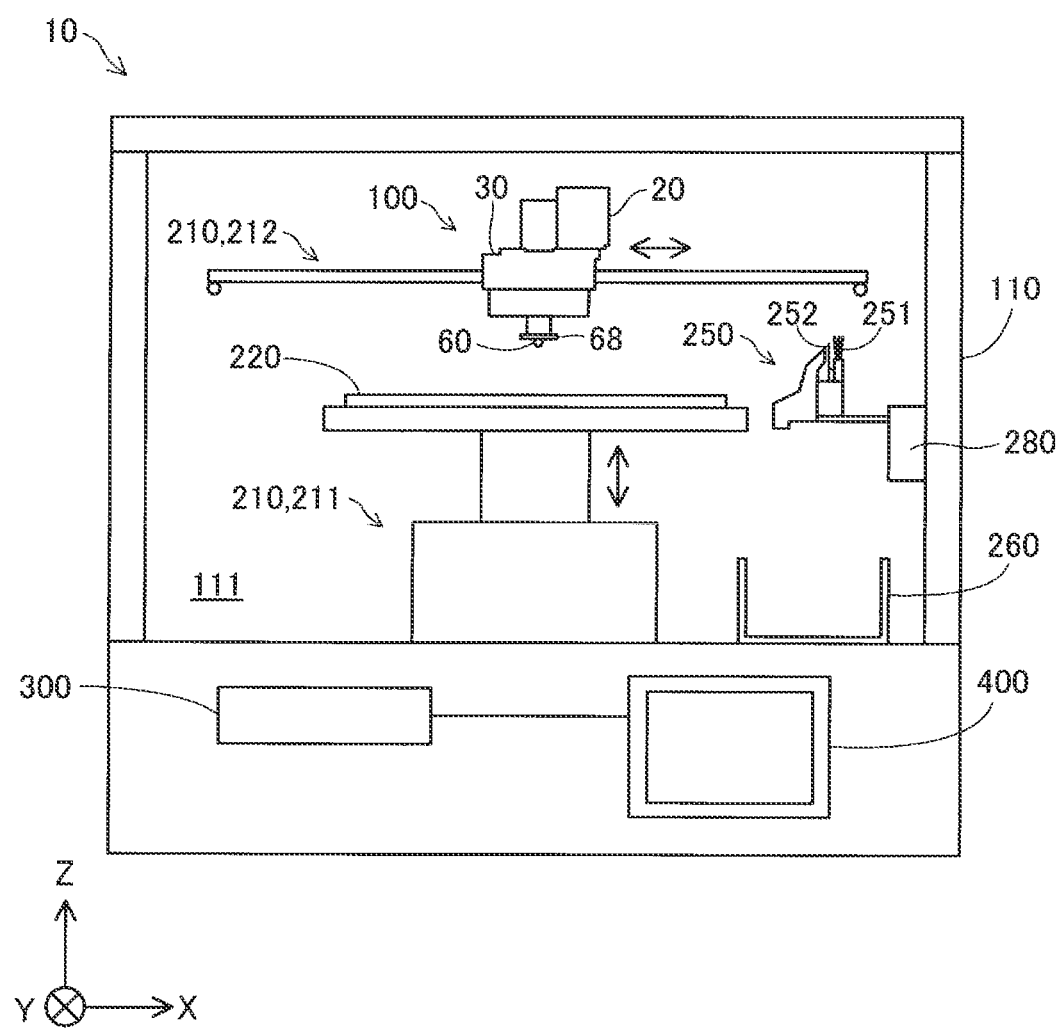
FIG. 1 is a diagram illustrating a schematic configuration of a three-dimensional shaping device according to a first embodiment.

FIG. 1 is a diagram illustrating a schematic configuration of a three-dimensional shaping device 10 according to a first embodiment. In FIG. 1, arrows along X, Y and Z directions orthogonal to one another are shown. The X, Y, and Z directions are directions along three spatial axes that are orthogonal to one another, that is, an X axis, a Y axis, and a Z axis, and include both one-side direction along the X axis, the Y axis, and the Z axis and an opposite direction. The X axis and the Y axis are axes along a horizontal plane, and the Z axis is an axis along a vertical line. A −Z direction is a vertical direction, and a +Z direction is a direction opposite to the vertical direction. The −Z direction is also referred to as "lower" side, and the +Z direction is also referred to as "upper" side. The X, Y and Z directions in FIG. 1 and the X, Y and Z directions in other figures indicate the same directions.

The three-dimensional shaping device 10 of the present embodiment includes an injection unit 100, a material accommodation unit 20, a housing 110, a drive unit 210, a stage 220, a cleaning mechanism 250, a control unit 300, and a display device 400 as a notification unit.

The injection unit 100 includes a plasticizing mechanism 30 that plasticizes at least a part of a plasticizing material supplied from the material accommodation unit 20 to generate a shaping material, and a nozzle 60. The injection unit 100 emits the shaping material plasticized by the plasticizing mechanism 30 from the nozzle 60 toward the stage 220. The injection unit 100 is also called an injection head, a discharge unit, a discharge head, an extrusion unit, an extrusion head, or simply a head. In the present specification, "injection" includes a meaning of "discharge" or "extrusion".

The housing 110 has a shaping space 111 inside. The stage 220 on which the shaping material is stacked is disposed in the shaping space 111. The housing 110 may be provided with, for example, an opening portion that allows communication between the shaping space 111 and the outside, a door that opens and closes the opening portion, and the like. By opening the door to make the opening portion at an opening state, a user can take out a shaped object shaped on the stage 220 from the opening portion.

The drive unit 210 changes a relative position between the injection unit 100 and the stage 220. In the present embodiment, the drive unit 210 includes a first drive unit 211 that moves the stage 220 along the Z direction, and a second drive unit 212 that moves the injection unit 100 along the X direction and the Y direction. The first drive unit 211 is configured as an elevating device, and includes a motor for moving the stage 220 in the Z direction. The second drive unit 212 is configured as a horizontal conveyance device, and includes a motor for sliding the injection unit 100 along the X direction and a motor for sliding the injection unit 100 along the Y direction. Each motor is driven under control of the control unit 300. In another embodiment, the drive unit 210 may be configured to move the stage 220 or the injection unit 100 in three directions of X, Y, and Z, or may be configured to move the stage 220 along the X direction and the Y direction to move the injection unit 100 in the Z direction.

The cleaning mechanism 250 includes a brush 251 and a blade 252 for cleaning the nozzle 60. The cleaning mechanism 250 is disposed in a region different from the stage 220 in a horizontal direction. The cleaning mechanism 250 is disposed at a height at which the brush 251 and the blade 252 can come into contact with the nozzle 60 in the vertical direction. In the present embodiment, the cleaning mechanism 250 is coupled to a height adjustment device 280 provided in the housing 110. The height adjustment device 280 includes a motor for moving the cleaning mechanism 250 along the Z direction under the control of the control unit 300. Below the cleaning mechanism 250, a purge waste material container 260 is provided. A resin dust removed by the cleaning mechanism 250 falls and is collected in the purge waste material container 260. The blade 252 is also called a flicker plate. The cleaning mechanism 250 is also referred to as a tip wipe assembly. The height adjustment device 280 may be coupled to each of the brush 251 and the blade 252 of the cleaning mechanism 250, and may be configured to individually adjust a height of each of the brush 251 and the blade 252.

The control unit 300 is configured with a computer including one or more processors, a memory, and an input and output interface through which signals are input from or output to the outside. In the present embodiment, the control unit 300 controls the injection unit 100 and the drive unit 210 based on shaping data for shaping a three-dimensional shaped object by the processor executing a program or instruction read into the memory to execute a three-dimensional shaping processing and a cleaning processing for cleaning the nozzle to be described later. The control unit 300 may not be configured with the computer but with a combination of a plurality of circuits.

The display device 400 is coupled to the control unit 300. The display device 400 is configured with, for example, a liquid crystal display or an organic EL display. In the present embodiment, the display device 400 is provided in the housing 110, but the display device 400 may be disposed separately from the housing 110.

Figure 2:
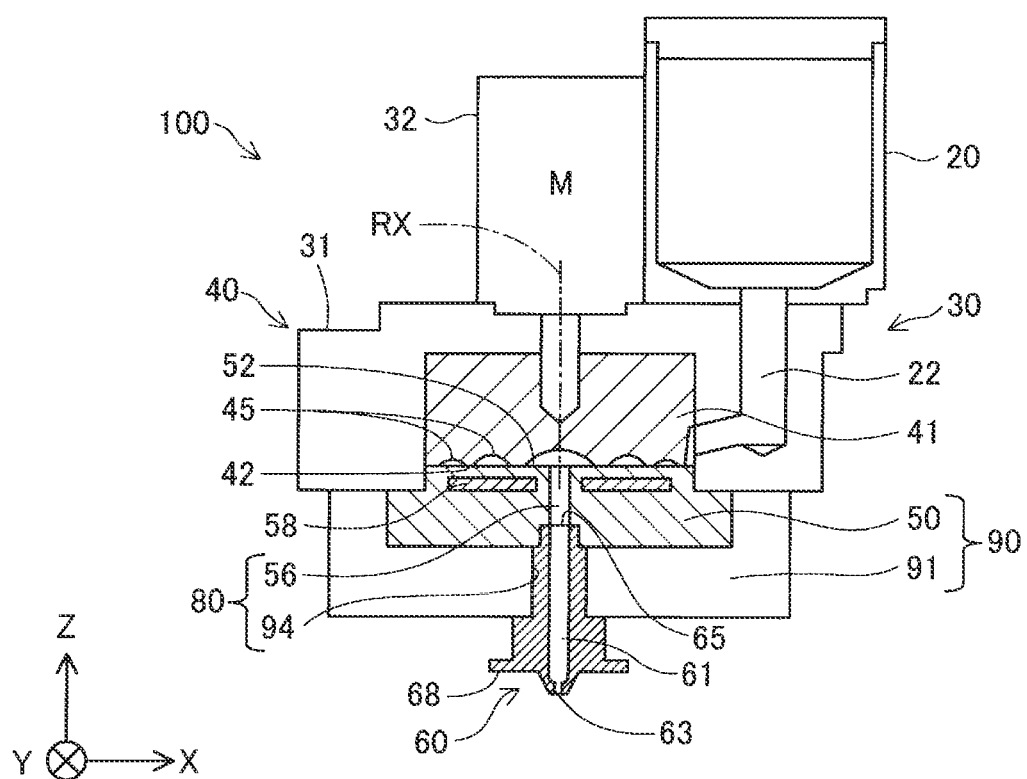
FIG. 2 is a diagram illustrating a schematic configuration of an injection unit.

FIG. 2 is a diagram illustrating a schematic configuration of the injection unit 100 according to the present embodiment. The injection unit 100 includes the plasticizing mechanism 30 and the nozzle 60. The plasticizing mechanism 30 includes a material transport mechanism 40 and a heating block 90. A material accommodated in the material accommodation unit 20 is supplied to the injection unit 100. Under the control of the control unit 300, the injection unit 100 plasticizes at least a part of the material supplied from the material accommodation unit 20 by the plasticizing mechanism 30 to generate the shaping material, and injects and stacks the generated shaping material from the nozzle 60 onto the stage 220. The material stacked on the stage 220 may also be referred to as a stacked material. In a three-dimensional shaping method in which the material is injected from the nozzle and the injected material is stacked to shape a three-dimensional shaped object may be referred to as a material extrusion (ME) method.

In the present embodiment, a term "plasticization" means that heat is applied to a material having thermoplasticity to melt the material. A term "melt" means not only that a material having thermoplasticity is heated to a temperature equal to or higher than a melting point to become a liquid, but also that a material having thermoplasticity is heated to a temperature equal to or higher than a glass transition point to be softened, thereby exhibiting fluidity.

A material in a state of pellets, powder, or the like is accommodated in the material accommodation unit 20 of the present embodiment. In the present embodiment, the material accommodated in the material accommodation unit 20 is a pellet-shaped resin. The material accommodation unit 20 of the present embodiment is configured by a hopper. The material accommodated in the material accommodation unit 20 is supplied to the material transport mechanism 40 of the plasticizing mechanism 30 via a supply path 22 provided below the material accommodation unit 20 so as to couple the material accommodation unit 20 and the injection unit 100.

The heating block 90 includes a heater 58. The heater 58 is controlled by the control unit 300, and is heated to a plasticizing temperature for plasticizing the material. The plasticizing temperature varies depending on a type of the material to be used, and is, for example, a glass transition point or a melting point of a material. When the material is an ABS resin, the plasticizing temperature is set to, for example, about 110° C., which is a glass transition point of the ABS resin. The heating block 90 is provided with a through hole 80. The through hole 80 is configured to allow the nozzle 60 to be attached and detached. The material transport mechanism 40 transports the shaping material toward a nozzle flow path 61 of the nozzle 60 attached to the through hole 80 of the heating block 90. The plasticizing mechanism 30 transports the material supplied from the material accommodation unit 20 to the material transport mechanism 40 toward the nozzle flow path 61 of the nozzle 60 by the material transport mechanism 40, and heats and plasticizes the material by the heat of the heating block 90.

The material transport mechanism 40 of the present embodiment includes a screw case 31, a screw 41 accommodated in the screw case 31, and a drive motor 32 for driving the screw 41. The heating block 90 of the present embodiment includes a case 91 having an opening portion 94, and a barrel 50 disposed in the case 91. The barrel 50 is provided with a communication hole 56. The through hole 80 of the present embodiment is formed by communication between the opening portion 94 and the communication hole 56. The heater 58 is incorporated in the barrel 50. The screw 41 of the present embodiment is a so-called flat screw and may be referred to as "scroll".

The screw 41 has a substantially cylindrical shape in which a height in a direction along a central axis RX is smaller than a diameter. The screw 41 has a groove forming surface 42, in which screw grooves 45 are formed, in a surface facing the barrel 50. The groove forming surface 42 faces a screw facing surface 52 of the barrel 50, which will be described later. The central axis RX of the present embodiment coincides with a rotation axis of the screw 41. Details of a configuration of the screw 41 on a groove forming surface 42 side will be described later.

The drive motor 32 is coupled to an opposite-side surface of the screw 41 from the groove forming surface 42. The drive motor 32 is driven under the control of the control unit 300. The screw 41 rotates about the central axis RX by a torque generated by the rotation of the drive motor 32. The drive motor 32 may not be directly coupled to the screw 41, and may be coupled to the screw 41 via, for example, a speed reducer.

The barrel 50 has the screw facing surface 52 facing the groove forming surface 42 of the screw 41. The case 91 is disposed so as to cover an opposite-side surface of the barrel 50 from the screw facing surface 52, that is, a lower surface of the barrel 50. The communication hole 56 and the opening portion 94 described above are provided at positions overlapping the central axis RX of the screw 41. That is, the through hole 80 is located at a position overlapping the central axis RX.

As described above, the nozzle 60 is detachably attached to the through hole 80 of the heating block 90. The nozzle 60 is also called a nozzle tip. The nozzle 60 is provided with the above nozzle flow path 61. The nozzle flow path 61 has a nozzle opening 63 at a tip end of the nozzle 60, and has an inflow port 65 at a rear end of the nozzle 60. The nozzle opening 63 is located at a position in the −Z direction of the inflow port 65. The material which flows into the nozzle flow path 61 through the through hole 80 and the inflow port 65 are discharged via the nozzle 60 of the present embodiment from the nozzle opening 63 toward the stage 220. The nozzle 60 includes a shield 68 above the tip end of the nozzle 60. More specifically, the shield 68 is disposed between the nozzle opening 63 and the heating block 90 on an outer periphery of the nozzle 60. The shield 68 has a disc shape along the horizontal direction. The shield 68 prevents the heat of the heating block 90 from being transferred to the stacked material.

Figure 3:
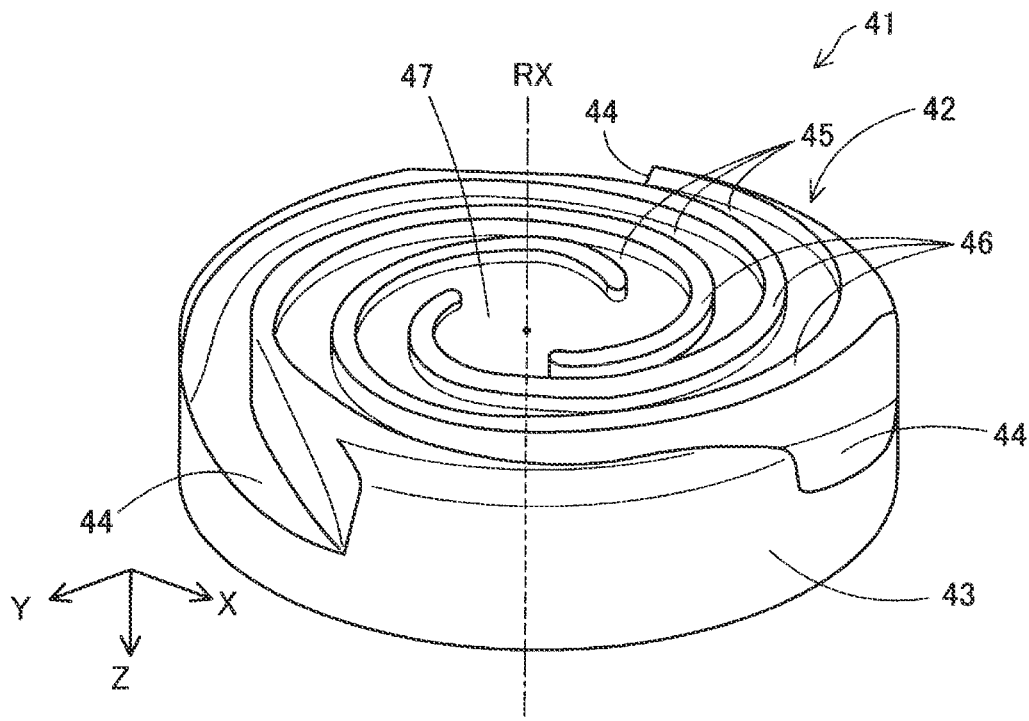
FIG. 3 is a schematic perspective view illustrating a configuration of a screw.

FIG. 3 is a schematic perspective view illustrating the configuration of the screw 41 on the groove forming surface 42 side. In FIG. 3, a position of the central axis RX of the screw 41 is indicated by an alternate long and short dash line. As described above, the groove forming surface 42 is provided with the screw grooves 45. A screw central portion 47, which is a central portion of the groove forming surface 42 of the screw 41, is configured as a recess to which one ends of the screw grooves 45 are coupled. The screw central portion 47 faces the communication hole 56 of the barrel 50. The screw central portion 47 intersects the central axis RX.

The screw groove 45 of the screw 41 configures a so-called scroll groove. The screw groove 45 extends in a spiral shape from the screw central portion 47 toward an outer periphery of the screw 41 so as to draw an arc. The screw groove 45 may be configured to extend in an involute curve shape or a spiral shape. The groove forming surface 42 is provided with ridge portions 46 each configuring a side wall portion of the screw groove 45 and extending along the screw groove 45. The screw groove 45 is continuous to a material introduction port 44 formed on a side surface 43 of the screw 41. The material introduction port 44 is a portion that receives the material supplied via the supply path 22 of the material accommodation unit 20.

FIG. 3 illustrates an example of the screw 41 including three screw grooves 45 and three ridge portions 46. The number of the screw grooves 45 and the ridge portions 46 provided in the screw 41 is not limited to three, and only one screw groove 45 may be provided, or two or more screw grooves 45 may be provided. In addition, FIG. 3 illustrates an example of the screw 41 in which the material introduction ports 44 are formed at three portions. The number of the material introduction ports 44 provided in the screw 41 is not limited to three. The material introduction port 44 may be provided only at one position or may be provided at two or more positions.

Figure 4:
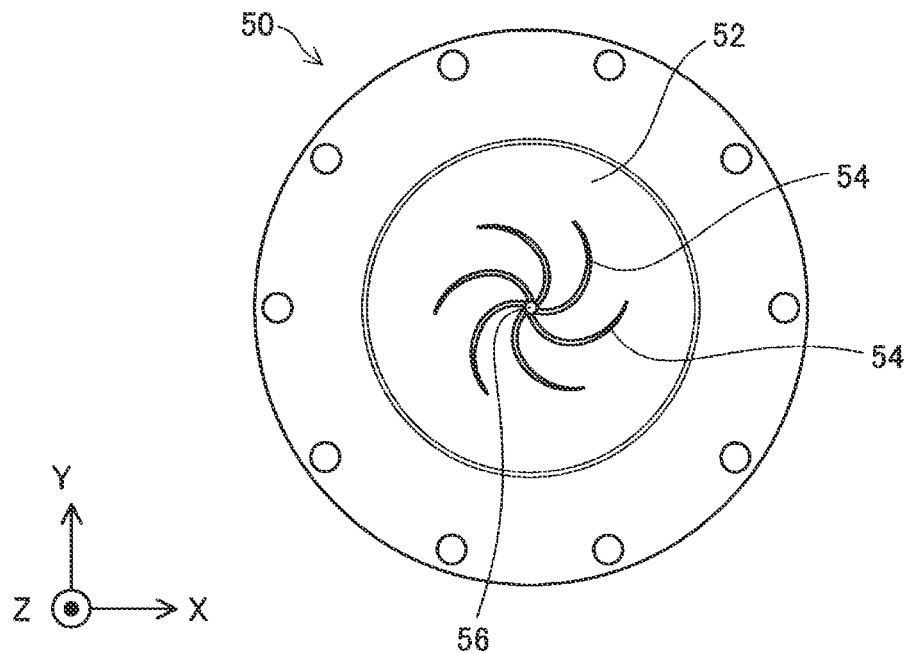
FIG. 4 is a top view illustrating a configuration of a barrel.

FIG. 4 is a top view illustrating a configuration of the barrel 50 on a screw facing surface 52 side. As described above, the communication hole 56 is formed in a center of the screw facing surface 52. A plurality of guide grooves 54 are formed around the communication hole 56 in the screw facing surface 52. Each of the guide grooves 54 has one end coupled to the communication hole 56, and the guide grooves 54 extend in a spiral shape from the communication hole 56 toward the outer periphery of the screw facing surface 52. Each of the guide grooves 54 has a function of guiding the shaping material to the communication hole 56. One end of the guide groove 54 may not be coupled to the communication hole 56. The barrel 50 may not be provided with the guide grooves.

Figure 5:
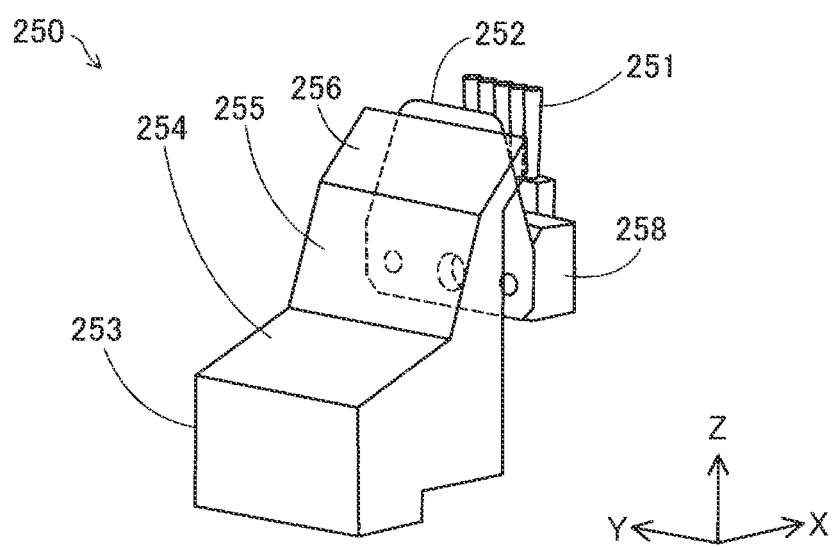
FIG. 5 is a view illustrating a schematic configuration of a cleaning mechanism.

FIG. 5 is a view illustrating a schematic configuration of the cleaning mechanism 250. As described above, the cleaning mechanism 250 includes the brush 251 and the blade 252. The brush 251 is configured by arranging a plurality of hair bundles along the Y direction. The blade 252 is a plate-shaped member along the Z direction and the Y direction. A tip end of the brush 251 and a tip end of the blade 252 are directed in the +Z direction. The tip end of the blade 252 is disposed to be lower than the tip end of the brush 251. As described above, the brush 251 and the blade 252 are disposed at the height at which the brush 251 and the blade 252 can come into contact with the nozzle 60. The tip end of the brush 251 is disposed at a height at which the tip end of the brush 251 can come into contact with the shield 68 provided in the nozzle 60, and the tip end of the blade 252 is disposed at a height at which the tip end of the blade 252 does not come into contact with the shield 68. In the present embodiment, the brush 251 and the blade 252 are integrated by a fixture 258, and can be replaced simultaneously at a time of consumption. The brush 251 and the blade 252 may be replaced individually.

The brush 251 and the blade 252 have a melting point higher than a plasticizing temperature of a plasticizing material to be plasticized in the injection unit 100. The brush 251 and the blade 252 have hardness lower than hardness of the nozzle 60. In the present embodiment, the hardness refers to Vickers hardness. Further, in the present embodiment, an elastic modulus of the blade 252 is higher than an elastic modulus of the brush 251. In the present embodiment, the elastic modulus refers to a Young's modulus. The nozzle 60 is formed of, for example, a metal such as a cemented carbide, a tool steel, or SUS, and the brush 251 and the blade 252 are formed of, for example, a metal such as SUS, an iron, or a brass. Each of the brush 251 and the blade 252 may be formed of a resin. Alternatively, the brush 251 may be formed of a natural fiber or a chemical fiber, and the blade 252 may be formed of a ceramic. In another embodiment, the elastic modulus of the blade 252 and the elastic modulus of the brush 251 may be the same, or the elastic modulus of the brush 251 may be higher than the elastic modulus of the blade 252.

The cleaning mechanism 250 further includes a purge portion 253. The purge portion 253 is also referred to as a purge ledge. In the present embodiment, the purge portion 253, the blade 252, and the brush 251 are arranged in this order along a +X direction. That is, the blade 252 is disposed between the purge portion 253 and the brush 251. A tip end of the purge portion 253 in the +Z direction is lower than the tip end of the blade 252. On the purge portion 253, in the cleaning processing to be described later, a waste material injected from the nozzle 60 falls and is collected into a spherical shape on the purge portion 253, and falls into the purge waste material container 260. An upper surface of the purge portion 253 is configured as an inclined surface in order to promote the fall of the waste material. More specifically, the purge portion 253 includes a first inclined surface 254, a second inclined surface 255, and a third inclined surface 256 in an order of being away from the blade 252 and in an order of descending in position in the vertical direction. The first inclined surface 254, the second inclined surface 255, and the third inclined surface 256 are each inclined such that a position of an end portion thereof in the +X direction is higher than a position of an end portion in the −X direction. In the present embodiment, inclination angles of the second inclined surface 255 and the third inclined surface 256 with respect to the horizontal plane are larger than an inclination angle of the first inclined surface 254 with respect to the horizontal plane.

Figure 6:
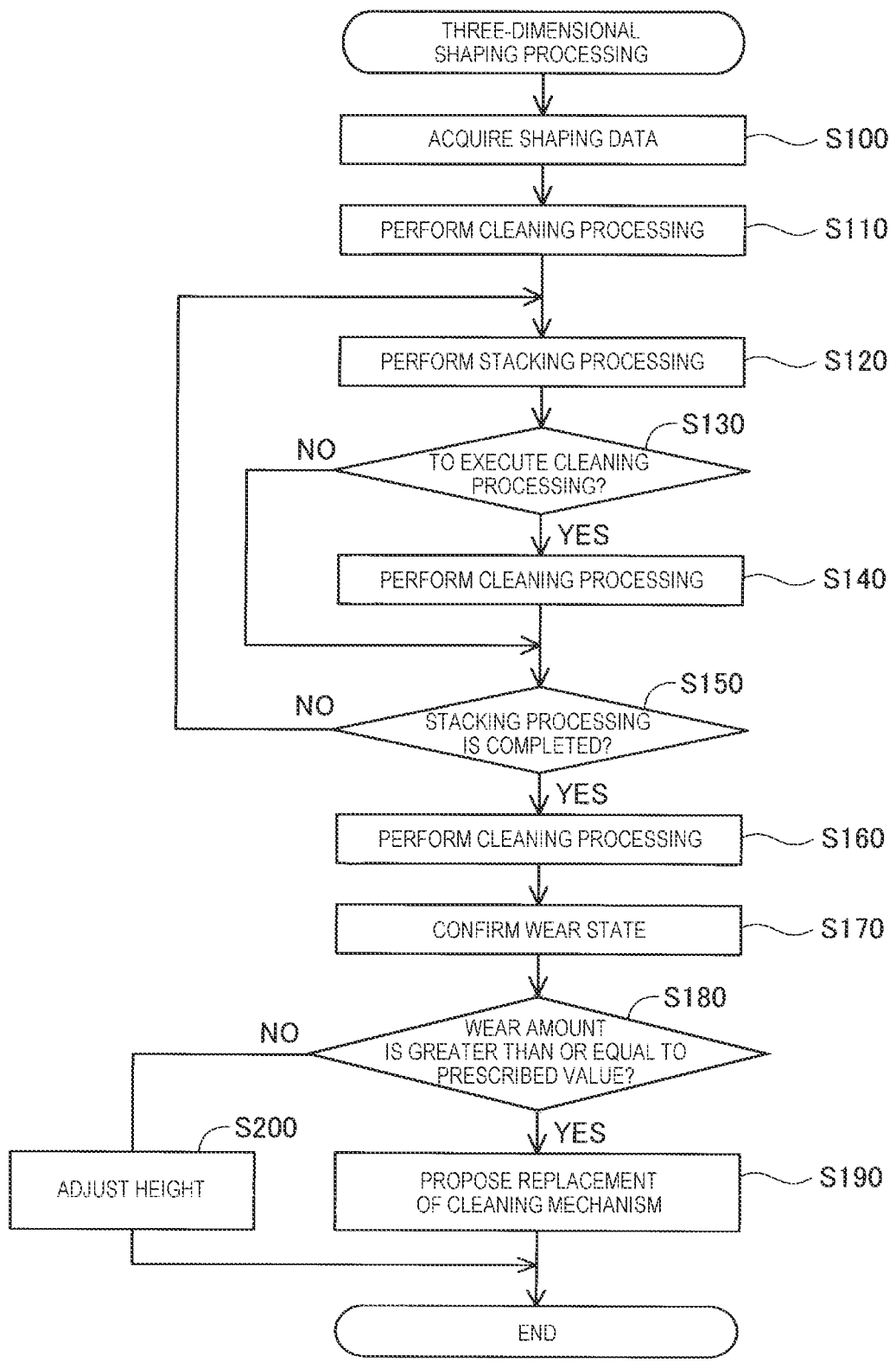
FIG. 6 is a flowchart of a three-dimensional shaping processing.

FIG. 6 is a flowchart of the three-dimensional shaping processing representing a method for manufacturing a three-dimensional shaped object. The three-dimensional shaping processing is executed when the control unit 300 of the three-dimensional shaping device 10 receives a predetermined operation from the user.

In step S100, the control unit 300 acquires shaping data from an external computer, a recording medium, or the like. The shaping data includes shaping path data representing a movement path of the nozzle 60 for each layer forming the three-dimensional shaped object. The shaping path data is associated with injection amount data indicating an injection amount of the material to be injected from the nozzle 60.

In step S110, the control unit 300 executes the cleaning processing. The cleaning processing is a processing for cleaning the nozzle 60. Step S110 in which the cleaning processing is performed and steps S140 and S160, which will be described later, are also referred to as a cleaning step.

FIG. 7 is a flowchart of the cleaning processing. When the cleaning processing is performed, in step S300, the control unit 300 controls the drive unit 210 to move the nozzle 60 above the purge portion 253, and then controls the plasticizing mechanism 30 to inject a predetermined amount of material from the nozzle 60 toward the purge portion 253. The material to be injected toward the purge portion 253 is also referred to as a waste material. The waste material injected onto the purge portion 253 falls into the purge waste material container 260 along the inclined surface of the purge portion 253. The amount of the material to be injected is, for example, an amount corresponding to a volume of the nozzle flow path 61.

After the waste material is injected on the purge portion 253, the control unit 300 moves the nozzle 60 toward the brush 251 and the blade 252, and executes a cleaning operation in step S310. The cleaning operation is an operation of bringing at least one of the brush 251 and the blade 252 into contact with the nozzle 60 by reciprocally moving the nozzle 60 such that the nozzle 60 cuts across the cleaning mechanism 250 a plurality of times.

FIG. 8 is a diagram illustrating the cleaning operation in the present embodiment. FIG. 8 illustrates a state in which the tip end of the nozzle 60 and the brush 251 and the blade 252 of the cleaning mechanism 250 are viewed from above, and a path along which the nozzle 60 moves is indicated by a broken line arrow. As illustrated in FIG. 8, the cleaning mechanism 250 has a longitudinal direction, and in the present embodiment, the longitudinal direction is the Y direction. In the present embodiment, in the cleaning operation, the control unit 300 brings the tip end of the nozzle 60 into contact with the blade 252, and then brings the tip end of the nozzle 60 into contact with the brush 251. Thereafter, the control unit 300 reciprocally moves the nozzle 60 so as to cut across the brush 251 and the blade 252 a plurality of times. Specifically, in the present embodiment, the control unit 300 causes the nozzle 60 to reciprocally move in the longitudinal direction of the cleaning mechanism 250, along a path having an M shape or a W shape, in other words, a path having a triangular wave shape. In this way, the control unit 300 can reciprocally move the nozzle 60 such that the nozzle 60 comes into contact with the brush 251 or the blade 252 at different positions in the cleaning operation. The control unit 300 may move the nozzle 60 so as to cut across different positions on the cleaning mechanism 250 during all movements in a reciprocating movement, and may move the nozzle 60 so as to cut cross the same position on the cleaning mechanism 250 during a part of the movements in the reciprocating movement.

The description will be made with reference to FIG. 7 again. When the cleaning operation is completed, the control unit 300 counts the number of times of executing the cleaning processing in step S320. Hereinafter, the number of times of executing the cleaning processing is also referred to as the number of times of cleaning. The counted number of times of cleaning is stored in a nonvolatile manner in a memory provided in the control unit 300. In the present embodiment, each time the control unit 300 executes the processing of step S310 once, the control unit 300 adds the number of times of cleaning once. The number of times of cleaning is continuously added until the cleaning mechanism 250 is replaced, and is reset when the cleaning mechanism 250 is replaced. The control unit 300 may detect the replacement of the cleaning mechanism 250 with a sensor or the like, or may detect the replacement of the cleaning mechanism 250 by receiving a predetermined operation from the user.

The description will be made with reference to FIG. again. When the cleaning processing is executed as described above, the control unit 300 subsequently starts executing a stacking processing in step S120. This stacking processing is a processing of shaping the three-dimensional shaped object including a plurality of layers by controlling the drive unit 210 and the injection unit 100 in accordance with the shaping data and injecting the shaping material from the injection unit 100 onto the stage 220 for each layer. The processing from step S120 to step S150 to be described later is also referred to as a shaping step.

During execution of the stacking processing, in step S130, the control unit 300 determines whether to execute the cleaning processing. For example, when injection abnormality of the shaping material is detected in the plasticizing mechanism 30, when a predetermined number of layers are formed, or when a type of the shaping material is to be changed, the control unit 300 determines to execute the cleaning processing. When it is determined to execute the cleaning processing, in step S140, the control unit 300 executes the cleaning processing the same as the cleaning processing described with reference to FIGS. 7 and 8. When it is determined not to execute the cleaning processing, the control unit 300 skips the cleaning processing in step S140.

In step S150, the control unit 300 determines whether the stacking processing is completed, that is, whether the shaping of the three-dimensional shaped object is completed. If the stacking processing is not completed, the control unit 300 returns the processing to step S120 and continues the stacking processing. If the stacking processing is completed, in step S160, the control unit 300 executes the cleaning processing the same as the cleaning processing described with reference to FIGS. 7 and 8.

After the cleaning processing in step S160 is completed, the control unit 300 confirms a wear state of the cleaning mechanism 250 in step S170. In the present embodiment, the control unit 300 specifies the wear state of the cleaning mechanism 250 by acquiring the number of times of cleaning counted in step S320 illustrated in FIG. 7 from an own memory. In the present embodiment, the number of times of cleaning represents the wear state of the cleaning mechanism 250. More specifically, the larger the number of times of cleaning is, the larger a wear amount of the cleaning mechanism 250 is. In another embodiment, a wear amount in the cleaning processing of each time may be obtained in advance, and the control unit 300 may calculate the wear amount based on the value and the number of times of cleaning.

In step S180, the control unit 300 determines whether the wear amount is greater than or equal to a prescribed value based on the wear state of the cleaning mechanism 250. For example, when the number of times of cleaning exceeds a predetermined threshold value, the control unit 300 determines that the wear amount is equal to or greater than the prescribed value. When it is determined that the wear amount is equal to or greater than the prescribed value, the control unit 300 proposes the replacement of the cleaning mechanism 250 in step S190. Specifically, for example, the control unit 300 controls the display device 400 to notify information prompting the replacement of the cleaning mechanism 250, thereby proposing the replacement of the cleaning mechanism 250. The control unit 300 may perform notification of the replacement of the cleaning mechanism 250 by outputting sound using a sound output device as the notification unit, or may perform the notification by turning on a light source such as an LED as the notification unit.

When it is determined in step S180 that the wear amount of the cleaning mechanism 250 is not equal to or greater than the prescribed value, the control unit 300 adjusts the height of the cleaning mechanism 250 in step S200. Specifically, the control unit 300 controls the height adjustment device 280 to increase the height of the cleaning mechanism 250 as the number of times of cleaning increases, and adjusts an interval between the cleaning mechanism 250 and the nozzle 60. In the present embodiment, in the height adjustment, the control unit 300 adjusts the interval between the cleaning mechanism 250 and the nozzle 60 such that the brush 251 and the blade 252 have a height that can come into contact with the nozzle 60, and during the cleaning processing, the tip end of the blade 252 does not come into contact with the shield 68, and the tip end of the brush 251 can come into contact with the shield 68. The height adjustment processing of the cleaning mechanism 250 may be executed at a timing at which the execution of a next three-dimensional shaping processing is started. When a series of processings described above is completed, the three-dimensional shaping processing ends.

According to the three-dimensional shaping device 10 of the present embodiment described above, the cleaning operation of bringing at least one of the brush 251 and the blade 252 into contact with the nozzle 60 is executed by reciprocally moving the nozzle 60 such that the nozzle 60 cuts across the cleaning mechanism 250 a plurality of times, and in the cleaning operation, the nozzle 60 reciprocally moves such that the nozzle 60 comes into contact with the brush 251 or the blade 252 at the different positions. Therefore, the nozzle 60 can be prevented from intensively cutting across and contacting a specific location of the cleaning mechanism 250, and thereby the cleaning mechanism 250 can be prevented from being worn at an early stage. As a result, a frequency of the replacement of the cleaning mechanism 250 can be reduced.

In the present embodiment, the elastic modulus of the blade 252 provided in the cleaning mechanism 250 is higher than the elastic modulus of the brush 251. Therefore, it is easy to remove the material adhered to the nozzle 60 by the blade 252.

In the present embodiment, in the cleaning operation, the control unit 300 moves the nozzle 60 in the longitudinal direction of the cleaning mechanism 250, along the path having a triangular wave shape. Therefore, the nozzle 60 can efficiently cut across the cleaning mechanism 250 at different positions.

Further, in the present embodiment, since the tip end of the blade 252 is disposed to be lower than the tip end of the brush 251 in the cleaning mechanism 250, the material adhered to the tip end of the nozzle 60 can be efficiently removed by the blade 252.

Further, in the present embodiment, since the tip end of the brush 251 is disposed at the height at which the tip end of the brush 251 can come into contact with the shield 68 and the tip end of the blade 252 is disposed at the height at which the tip end of the blade 252 does not come into contact with the shield 68, the material adhered to the shield 68 can be removed by the brush 251.

Further, in the present embodiment, in the cleaning operation, after bringing the tip end of the nozzle 60 into contact with the blade 252 to remove the shaping material adhered to the tip end of the nozzle 60, the control unit 300 brings the tip end of the nozzle 60 into contact with the brush 251, so that the nozzle 60 can be cleaned efficiently.

Further, in the present embodiment, in the cleaning processing, the control unit 300 causes the nozzle 60 to move toward the brush 251 and the blade 252 after the waste material is injected from the nozzle 60 on the purge portion 253, so that the nozzle 60 can be cleaned after removing the shaping material remaining in the nozzle flow path 61.

Further, in the present embodiment, since the control unit 300 specifies the wear state of the cleaning mechanism 250 based on the number of times of executing the cleaning processing, the wear state can be grasped by a simple processing.

Further, in the present embodiment, since the control unit 300 proposes the replacement of the cleaning mechanism 250 in accordance with the wear state of the cleaning mechanism 250, it is possible to improve convenience.

Further, in the present embodiment, since the control unit 300 adjusts the interval between the cleaning mechanism 250 and the nozzle 60 in accordance with the wear state of the cleaning mechanism 250, the nozzle 60 can be cleaned more reliably.

In addition, in the present embodiment, since the cleaning processing is executed in three stages of before shaping, during shaping, and after shaping, shaping of the three-dimensional shaped object can be prevented from being performed while the material is adhered to the nozzle 60. As a result, the resin dust can be prevented from falling from the nozzle 60 onto the three-dimensional shaped object being shaped, and thus a shaping accuracy of the three-dimensional shaped object can be improved. In another embodiment, the cleaning processing may be executed at any one or two timings among three timings of before shaping, during shaping, and after shaping. Further, the control unit 300 may execute the cleaning processing when a predetermined operation from the user is received regardless of these timings.

Figure 10:
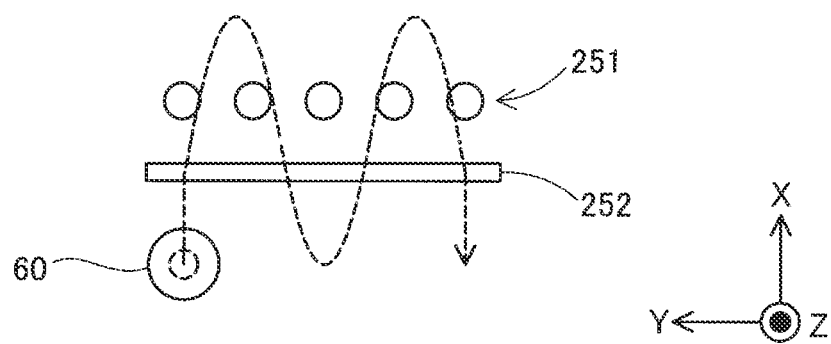
FIG. 10 is a diagram illustrating another example of the cleaning operation.
Figure 11:
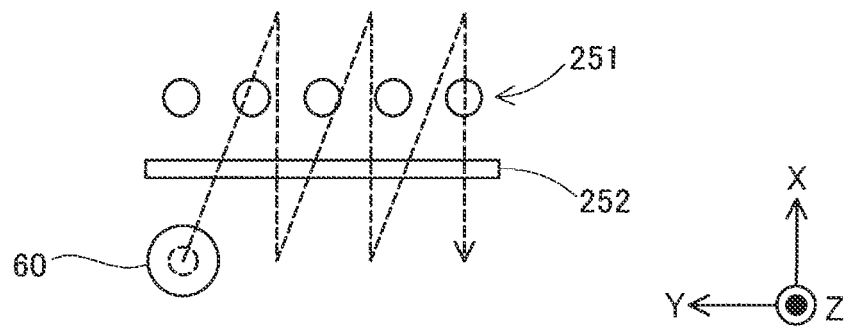
FIG. 11 is a diagram illustrating another example of the cleaning operation.
Figure 12:
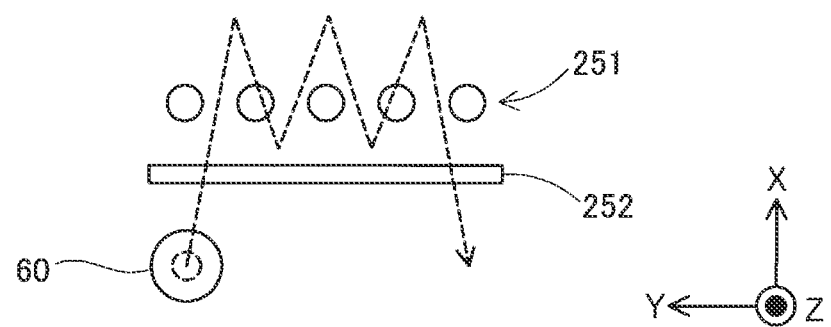
FIG. 12 is a diagram illustrating another example of the cleaning operation.

FIGS. 9 to 12 are diagrams each illustrating another example of the cleaning operation. FIG. 9 illustrates an example in which the nozzle 60 is moved in the longitudinal direction of the cleaning mechanism 250 along a path having a rectangular wave shape. FIG. 10 illustrates an example in which the nozzle 60 is moved in the longitudinal direction of the cleaning mechanism 250 along a path having a sine wave shape. FIG. 11 illustrates an example in which the nozzle 60 is moved in the longitudinal direction of the cleaning mechanism 250 along a path having a sawtooth wave shape. As shown in these figures, the control unit 300 can reciprocally move the nozzle 60 along various paths in the cleaning operation. As illustrated in FIG. 12, in the cleaning operation, the control unit 300 may set the number of times the nozzle 60 cuts across the brush 251 to be larger than the number of times the nozzle 60 cuts across the blade 252. In this way, the wear of the blade 252 can be reduced.

B. Second Embodiment

Figure 13:
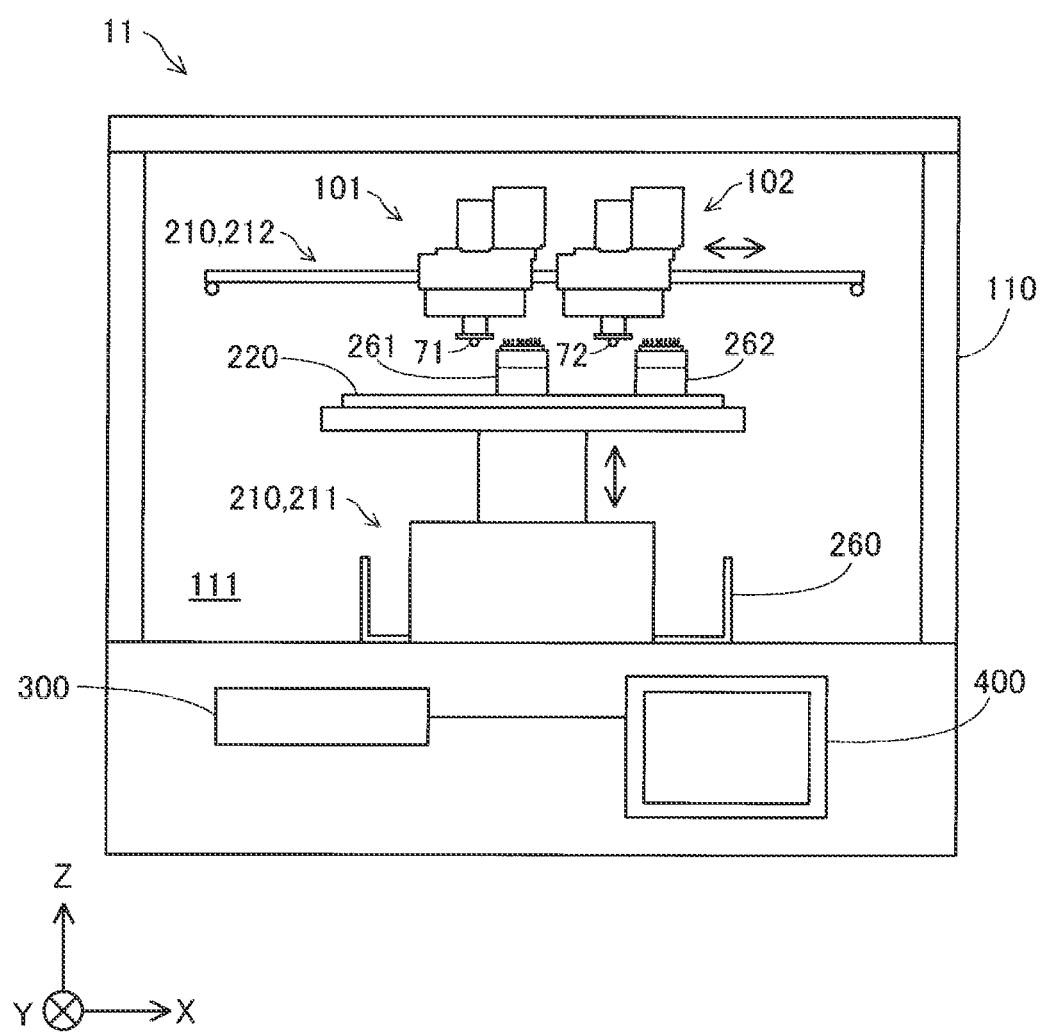
FIG. 13 is a diagram illustrating a schematic configuration of a three-dimensional shaping device according to a second embodiment.

FIG. 13 is a diagram illustrating a schematic configuration of a three-dimensional shaping device 11 according to a second embodiment. In the present embodiment, the three-dimensional shaping device 11 includes two injection units and two cleaning mechanisms. Specifically, the injection unit in the present embodiment includes a first injection unit 101 provided with a first nozzle 71 through which a first shaping material is to be injected, and a second injection unit 102 provided with a second nozzle 72 through which a second shaping material is to be injected. The first shaping material and the second shaping material can be, for example, a combination of a shaping material and a supporting material, and can also be, for example, a combination of materials of different colors or different materials. Configurations of the first injection unit 101 and the second injection unit 102 are the same as the configuration of the injection unit 100 in the first embodiment.

The cleaning mechanism in the present embodiment includes a first cleaning mechanism 261 including a brush and a blade for cleaning the first nozzle 71, and a second cleaning mechanism 262 including a brush and a blade for cleaning the second nozzle 72. Configurations of the first cleaning mechanism 261 and the second cleaning mechanism 262 are the same as the configuration of the cleaning mechanism 250 in the first embodiment. In the present embodiment, it is assumed that the two cleaning mechanisms 261 and 262 are disposed at a predetermined interval in the X direction, and the purge portion, the blade, and the brush provided in each of the cleaning mechanisms 261 and 262 are arranged in this order toward the +Y direction.

In the present embodiment, the control unit 300 executes the three-dimensional shaping processing illustrated in FIG. 6 using the two injection units 101 and 102 and the two cleaning mechanisms 261 and 262. In the three-dimensional shaping processing according to the present embodiment, the two injection units 101 and 102 are selectively used to execute the stacking processing. Then, in the cleaning processing shown in FIG. 7, the control unit 300 simultaneously cleans the first nozzle 71 and the second nozzle 72 by using the first cleaning mechanism 261 and the second cleaning mechanism 262 by performing the cleaning operation as shown in FIG. 8 for the first nozzle 71 provided in the first injection unit 101 and the second nozzle 72 provided in the second injection unit 102, respectively.

According to the second embodiment described above, since the two nozzles 71 and 72 provided in the two injection units 101 and 102 can be simultaneously cleaned, a time required for the cleaning processing can be shortened. As a result, the three-dimensional shaping processing can be efficiently executed. In the present embodiment, an example in which the three-dimensional shaping device 11 is provided with the two injection units and the two cleaning mechanisms is shown, but three or more injection units and three or more cleaning mechanisms may be provided.

C. Third Embodiment

Figure 14:
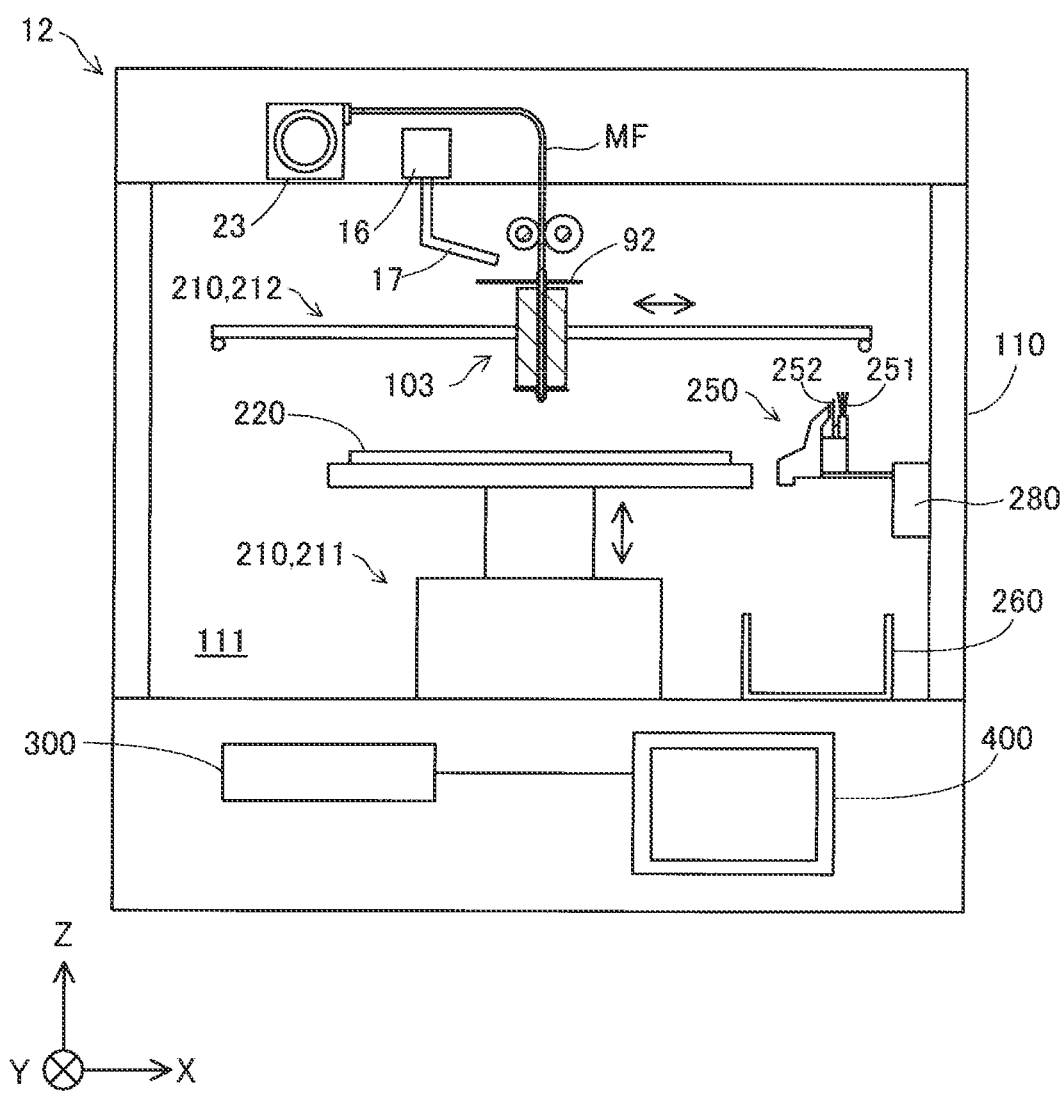
FIG. 14 is a diagram illustrating a schematic configuration of a three-dimensional shaping device according to a third embodiment.

FIG. 14 is a diagram illustrating a schematic configuration of a three-dimensional shaping device 12 according to a third embodiment. The three-dimensional shaping device 12 of the third embodiment is different from that of the first embodiment mainly in the configuration of the injection unit, and other configurations and processing contents of the three-dimensional shaping processing are the same as those of the first embodiment. Therefore, the configuration of the injection unit will be mainly described below.

The three-dimensional shaping device 12 of the present embodiment includes an injection unit 103, a material accommodation unit 23, the housing 110, the drive unit 210, the stage 220, and the control unit 300. The three-dimensional shaping device 12 further includes a blower 16. The blower 16 is configured as an air blowing device that blows air toward the injection unit 103 via a manifold 17. In the present embodiment, a part of the manifold 17, the injection unit 103, the drive unit 210, and the stage 220 are accommodated in the shaping space 111 in the housing 110.

The material accommodation unit 23 of the present embodiment is configured as a holder that accommodates a filamentous material. The material accommodation unit 23 is configured to be capable of winding the material accommodated inside to an outside of the material accommodation unit 23.

Figure 15:
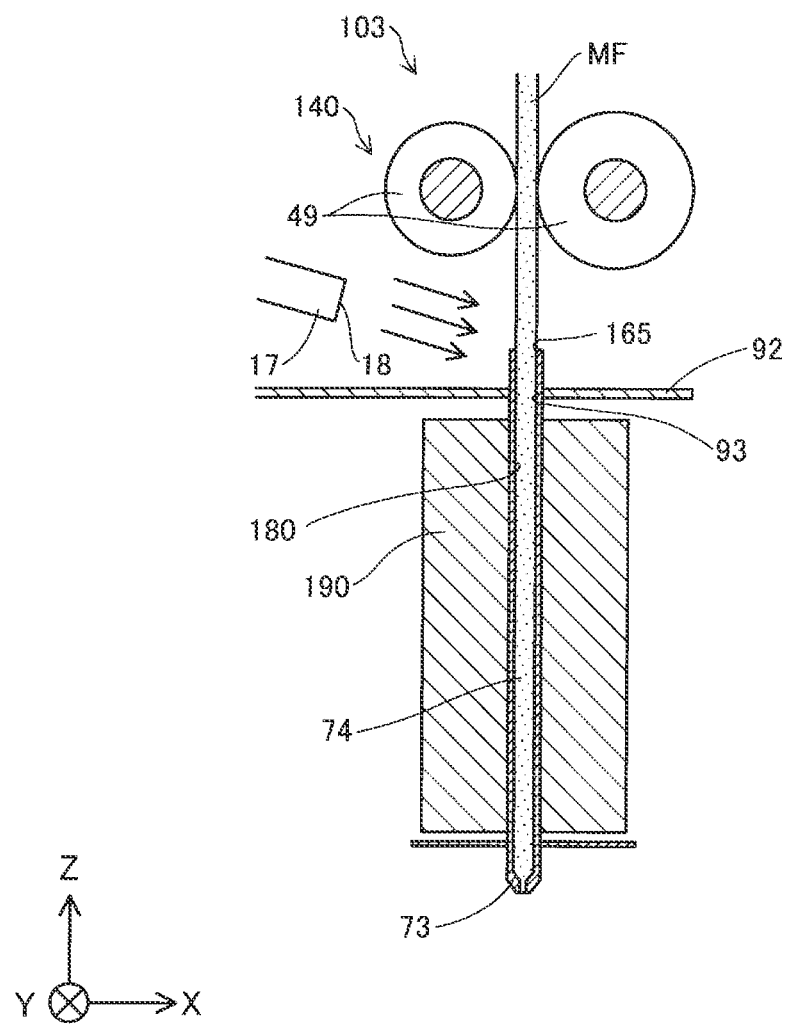
FIG. 15 is a diagram illustrating a schematic configuration of an injection unit according to the third embodiment.

FIG. 15 is a diagram illustrating a schematic configuration of the injection unit 103 according to the present embodiment. The injection unit 103 includes a heating block 190 including a heater and serving as a plasticizing mechanism provided with a through hole 180, a nozzle 73 detachably attached to the through hole 180, and a material transport mechanism 140 that transports a material MF toward a nozzle flow path 74 of the nozzle 73 attached to the heating block 190. The injection unit 103 is disposed between the material transport mechanism 140 and the heating block 190 in the Z direction, and further includes a shield 92 that prevents heat transfer from the heating block 190 to the material transport mechanism 140. Different from the first embodiment, the material transport mechanism 140 of the present embodiment includes two wheels 49 instead of including the screw case 31 and the screw 41. Different from the first embodiment, the heating block 190 does not include the barrel 50 and the case 91.

The nozzle 73 of the present embodiment is attached to the heating block 190 by being inserted, from the −Z direction, into the through hole 180 and a shield opening 93 provided in the shield 92. That is, in the present embodiment, a dimension of the nozzle 73 along the Z direction and a dimension of the nozzle flow path 74 along the Z direction are larger than a dimension of the through hole 180 along the Z direction. Therefore, in the present embodiment, an inflow port 165 provided at a rear end of the nozzle 73 is located in a +Z direction of the heating block 190, more specifically, in a +Z direction side of the shield 92.

By the rotation of the two wheels 49 configuring the material transport mechanism 140, the material MF in the material accommodation unit 23 is drawn to the outside and guided between the two wheels 49, and is transported toward the nozzle flow path 74 of the nozzle 73 attached to the through hole 180 of the heating block 190. The heating block 190 plasticizes the material MF transported into the nozzle flow path 74 of the nozzle 73 by heat of a heater (not shown) incorporated in the heating block 190.

In the vicinity of the inflow port 165 of the nozzle 73, the material MF of the present embodiment is cooled by air sent from the above blower 16 via the manifold 17. Accordingly, the plasticization of the material MF in the vicinity of the inflow port 165 is prevented, and the material MF is efficiently transported into the inflow port 165. An outlet end 18 of the manifold 17 is located on the +Z direction side of the shield 92. Accordingly, the air sent out from the manifold 17 is easily guided to the vicinity of the inflow port 165 by the shield 92, so that the material MF in the vicinity of the inflow port 165 is efficiently cooled.

Although the configuration of the cleaning mechanism 250 in the present embodiment is the same as that of the first embodiment, the tip end of the brush 251 does not come into contact with the shield 92 during the cleaning processing. A reason for that is that in the present embodiment, the shield 92 is located to be higher than the heating block 190.

In the three-dimensional shaping device 12 of the present embodiment described above, the nozzle 73 can also be cleaned by using the cleaning mechanism 250.

D. Other Embodiments

D1. In the above embodiment, the cleaning mechanism 250 includes the purge portion 253. On the other hand, the cleaning mechanism 250 may not include the purge portion 253.

D2. In the above embodiment, the nozzles 60 and 73 include the shields 68 and 92. On the other hand, the nozzles 60 and 73 may not include the shields 68 and 92.

D3. In the above embodiment, the control unit 300 may separately confirm the wear states of the blade 252 and the brush 251, and may individually propose the replacement. More specifically, the control unit 300 separately counts the number of times the nozzle 60 passes through the blade 252 and the brush 251, and stores the number of times of cleaning in the memory, respectively. Then, the control unit 300 compares the threshold values, which are respectively set for the blade 252 and the brush 251, with the respective numbers of times of cleaning. In this way, the control unit 300 can separately propose the replacement for the blade 252 and the brush 251.

D4. In the above embodiment, the counting of the number of times of cleaning, the detecting of the wear amount and the proposal of replacement of the cleaning mechanism may not be executed. That is, the processings of steps S170 to S190 in FIG. 6 may be omitted.

D5. In the above embodiment, the interval between the nozzle 60 and the cleaning mechanism 250 is adjusted by using the height adjustment device 280. On the other hand, for example, if the drive unit 210 is capable of moving the injection unit 100 along the Z direction, the control unit 300 may adjust the interval between the nozzle 60 and the cleaning mechanism 250 during the cleaning processing by adjusting the height of the injection unit 100.

D6. In the above embodiment, height adjustment of the cleaning mechanism 250 based on the height adjustment device 280 may be omitted. That is, the processing of step S200 in FIG. 6 may be omitted. In this case, the cleaning mechanism 250 may be directly fixed to the housing 110 instead of the height adjustment device 280.

D7. In the above embodiment, the wear state of the cleaning mechanism 250 is determined based on the number of times of cleaning. On the other hand, for example, a distance measuring sensor capable of detecting the height of the blade 252 or the brush 251 may be provided in the housing 110, and the wear state of the cleaning mechanism may be determined based on a measurement result of the height of the blade 252 or the brush 251 based on the sensor. In this case, the lower the height of the blade 252 or the brush 251 is, the greater the wear amount is.

D8. In the above embodiment, the cleaning mechanism 250 is fixed to the housing 110 via the height adjustment device 280. On the other hand, the cleaning mechanism 250 may be fixed to the stage 220. If the cleaning mechanism 250 is fixed to the stage 220, the control unit 300 can adjust the interval between the cleaning mechanism 250 and the nozzle 60 during the cleaning processing using the second drive unit 212.

D9. In the above embodiment, the cleaning mechanism 250 is disposed in a region different from the stage 220 in the horizontal direction. On the other hand, the cleaning mechanism 250 may be disposed in a region which overlaps the stage 220 in the horizontal direction and which is different from a shaping region of the stage 220 on which the three-dimensional shaped object is to be shaped. Accordingly, a compact three-dimensional shaping device can be obtained.

E. Other Embodiments

The present disclosure is not limited to the above embodiments, and can be implemented by various configurations without departing from the gist of the present disclosure. For example, in order to solve a part or all of problems described above, or to achieve a part or all of effects described above, technical characteristics in the embodiments corresponding to technical characteristics in aspects to be described below can be replaced or combined as appropriate. Further, when the technical features are not described as essential in the present description, the technical features can be appropriately deleted.

1. According to a first aspect of the present disclosure, a three-dimensional shaping device is provided. The three-dimensional shaping device includes: an injection unit including a plasticizing mechanism configured to plasticize a plasticizing material to generate a shaping material and a nozzle, and configured to inject the shaping material from the nozzle; a stage on which the shaping material is to be stacked; a drive unit configured to change a relative position between the injection unit and the stage; a cleaning mechanism including a brush and a blade; and a control unit configured to execute a cleaning processing for cleaning the nozzle, in which the brush and the blade are disposed at a height at which the brush and the blade are able to come into contact with the nozzle, the brush and the blade have a melting point higher than a plasticizing temperature of the plasticizing material, and have hardness lower than hardness of the nozzle, in the cleaning processing, the control unit is configured to execute a cleaning operation of bringing at least one of the brush and the blade into contact with the nozzle by reciprocally moving the nozzle such that the nozzle cuts across the cleaning mechanism a plurality of times, and the control unit is configured to reciprocally move the nozzle such that the nozzle comes into contact with the brush or the blade at different positions in the cleaning operation.

In such an aspect, the cleaning operation of bringing at least one of the brush and the blade into contact with the nozzle is executed by reciprocally moving the nozzle such that the nozzle cuts across the cleaning mechanism a plurality of times, and in the cleaning operation, the nozzle is reciprocally moved such that the nozzle comes into contact with the brush or the blade at the different positions. Therefore, the nozzle can be prevented from intensively cutting across a specific location of the cleaning mechanism, and thereby the cleaning mechanism can be prevented from being worn at an early stage. As a result, a frequency of the replacement of the cleaning mechanism can be reduced.

2. In the above aspect, an elastic modulus of the blade may be higher than an elastic modulus of the brush. In such an aspect, the material adhered to the nozzle can be easily removed by the blade.

3. In the above aspect, in the cleaning operation, the control unit may be configured to reciprocally move the nozzle in a longitudinal direction of the cleaning mechanism along a path having a triangular wave shape, a rectangular wave shape, a sine wave shape, or a sawtooth wave shape. In such an aspect, the nozzle can efficiently cut across the cleaning mechanism at different positions.

4. In the above aspect, a tip end of the blade may be disposed to be lower than a tip end of the brush. In such an aspect, the material adhered to the tip end of the nozzle can be efficiently removed by the blade.

5. In the above aspect, the nozzle may include a shield above a tip end of the nozzle, the tip end of the brush may be disposed at a height at which the tip end of the brush is able to come into contact with the shield, and the tip end of the blade may be disposed at a height at which the tip end of the blade does not come into contact with the shield. In such an aspect, the material adhered to the shield can be removed.

6. In the above aspect, in the cleaning operation, the control unit may be configured to bring the tip end of the nozzle into contact with the blade, and then bring the tip end of the nozzle into contact with the brush. In such an aspect, an entire nozzle can be cleaned by the brush after the material adhered to the tip end of the nozzle is removed by the blade. Therefore, the nozzle can be cleaned efficiently.

7. In the above aspect, in the cleaning operation, the control unit may be configured to set the number of times the nozzle cuts across the brush to be larger than the number of times the nozzle cuts across the blade. In such an aspect, the wear of the blade can be reduced.

8. In the above aspect, the cleaning mechanism may include a purge portion, the blade may be disposed between the purge portion and the brush, and the purge portion may include a first inclined surface, a second inclined surface, and a third inclined surface in an order of being away from the blade and in an order of descending in position in a vertical direction, and inclination angles of the second inclined surface and the third inclined surface with respect to a horizontal plane may both be larger than an inclination angle of the first inclined surface with respect to the horizontal plane.

9. In the above aspect, in the cleaning processing, the nozzle may be moved toward the brush and the blade after the shaping material is injected from the nozzle on the purge portion. In such an aspect, the nozzle can be cleaned after the material remaining in the nozzle is removed.

10. In the above aspect, the injection unit may include a first injection unit provided with a first nozzle through which a first shaping material is to be injected, and a second injection unit provided with a second nozzle through which a second shaping material is to be injected, the cleaning mechanism may include a first cleaning mechanism including a brush and a blade for cleaning the first nozzle, and a second cleaning mechanism including a brush and a blade for cleaning the second nozzle, and the control unit may be configured to simultaneously execute the cleaning processing on the first nozzle and the second nozzle using the first cleaning mechanism and the second cleaning mechanism. In such an aspect, since the nozzles provided in the two injection units can be simultaneously cleaned, a time required for the cleaning processing can be shortened.

11. In the above aspect, the control unit may be configured to specify a wear state of the cleaning mechanism based on the number of times of executing the cleaning processing. In such an aspect, the wear state can be grasped by a simple processing.

12. In the above aspect, the three-dimensional shaping device may further include: a notification unit, and the control unit may be configured to control the notification unit in accordance with the wear state to notify information of prompting replacement of the cleaning mechanism. In such an aspect, convenience of the three-dimensional shaping device can be improved.

13. In the above aspect, the control unit may be configured to adjust an interval between the cleaning mechanism and the nozzle in accordance with the wear state. In such an aspect, the nozzle can be cleaned more reliably.

14. According to a second aspect of the present disclosure, there is provided a method for manufacturing a three-dimensional shaped object in a three-dimensional shaping device, the three-dimensional shaping device including: an injection unit including a plasticizing mechanism configured to plasticize a plasticizing material to generate a shaping material and a nozzle, and configured to inject the shaping material from the nozzle; a stage on which the shaping material is to be stacked; a drive unit configured to change a relative position between the injection unit and the stage; and a cleaning mechanism including a brush and a blade, in which the brush and the blade are disposed at a height at which the brush and the blade are able to come into contact with the nozzle, and the brush and the blade have a melting point higher than a plasticizing temperature of the plasticizing material, and have hardness lower than hardness of the nozzle. This manufacturing method includes a shaping step of shaping a three-dimensional shaped object by injecting a shaping material from the injection unit to the stage; and a cleaning step of executing a cleaning operation of bringing at least one of the brush and the blade into contact with the nozzle by reciprocally moving the nozzle such that the nozzle cuts across the cleaning mechanism a plurality of times at any one timing of before the shaping step, during the shaping step and after the shaping step, in which in the cleaning step, the nozzle is reciprocally moved such that the nozzle comes into contact with the brush or the blade at different positions in the cleaning operation.

What is claimed is:

1. A three-dimensional shaping device, comprising: an injection head including: a plasticizing mechanism configured to plasticize a plasticizing material to generate a shaping material; and a nozzle from which the shaping material is ejected; a stage on which the shaping material is stacked; a motor configured to change a relative position between the injection head and the stage; a cleaning mechanism including a brush and a blade, each of the brush and the blade extending along a first direction so that the brush and the blade are parallel to each other and face each other along a second direction perpendicular to the first direction; a memory configured to store a program; and a processor configured to execute the program so as to: cause the nozzle to reciprocally move several times along a zigzag path in a cleaning operation when viewed along a third direction perpendicular to the first and second directions such that the nozzle passes from a side of the blade toward a side of the brush to contact a first point of at least one of the brush and blade, and the nozzle passes from the side of the brush toward the side of the blades to contact a second point of at least one of the brush and the blade, the first point and the second point are different positions in the first direction, wherein the nozzle contacts the different positions of at least one of the brush and the blade several times without contacting the same position of the brush or the blade twice during an entirety of the cleaning operation,
wherein the brush and the blade are disposed at a height at which the brush and the blade are configured to come into contact with the nozzle, and the brush and the blade have a melting point higher than a plasticizing temperature of the plasticizing material, and have hardness lower than hardness of the nozzle.

2. The three-dimensional shaping device according to claim 1, wherein
an elastic modulus of the blade is higher than an elastic modulus of the brush.

3. The three-dimensional shaping device according to claim 1, wherein
in the cleaning operation, the processor is configured to reciprocally move the nozzle in a longitudinal direction of the cleaning mechanism along a path having a triangular wave shape, a rectangular wave shape, a sine wave shape, or a sawtooth wave shape.

4. The three-dimensional shaping device according to claim 1, wherein
a tip end of the blade is disposed to be lower than a tip end of the brush.

5. The three-dimensional shaping device according to claim 1, wherein
the nozzle includes a shield above a tip end of the nozzle,
a tip end of the brush is disposed at a height at which the tip end of the brush is configured to come into contact with the shield, and
the tip end of the blade is disposed at a height at which the tip end of the blade does not come into contact with the shield.

6. The three-dimensional shaping device according to claim 1, wherein
in the cleaning operation, the processor is configured to bring a tip end of the nozzle into contact with the blade, and then bring the tip end of the nozzle into contact with the brush.

7. The three-dimensional shaping device according to claim 1, wherein
in the cleaning operation, the processor is configured to set the number of times the nozzle passes across the brush to be larger than the number of times the nozzle passes across the blade.

8. The three-dimensional shaping device according to claim 1, wherein
the cleaning mechanism includes a purge portion,
the blade is disposed between the purge portion and the brush, and
the purge portion includes a first inclined surface, a second inclined surface, and a third inclined surface in an order of being away from the blade and in an order of descending in position in a vertical direction, and inclination angles of the second inclined surface and the third inclined surface with respect to a horizontal plane are both larger than an inclination angle of the first inclined surface with respect to the horizontal plane.

9. The three-dimensional shaping device according to claim 8, wherein
in the cleaning processing, the processor is configured to move the nozzle toward the brush and the blade after the shaping material is injected from the nozzle on the purge portion.

10. The three-dimensional shaping device according to claim 1, wherein
the injection head includes a first injection head provided with a first nozzle through which a first shaping material is injected, and a second injection head provided with a second nozzle through which a second shaping material is injected,
the cleaning mechanism includes a first cleaning mechanism including a brush and a blade for cleaning the first nozzle, and a second cleaning mechanism including a brush and a blade for cleaning the second nozzle, and
the processor is configured to simultaneously execute the cleaning processing on the first nozzle and the second nozzle using the first cleaning mechanism and the second cleaning mechanism.

11. The three-dimensional shaping device according to claim 1, wherein the processor is configured to specify a wear state of the cleaning mechanism based on the number of times of executing the cleaning processing.

12. The three-dimensional shaping device according to claim 11, comprising:
a notification device, wherein
the processor is configured to control the notification device in accordance with the wear state to notify information of prompting replacement of the cleaning mechanism.

13. The three-dimensional shaping device according to claim 11, wherein
the processor is configured to adjust an interval between the cleaning mechanism and the nozzle in accordance with the wear state.

14. The three-dimensional shaping device according to claim 11,
wherein the processor is further configured to cause the memory to store the number of times of executing the cleaning operation, and to reset the number of times of executing the cleaning operation when the cleaning mechanism is replaced.

15. The three-dimensional shaping device according to claim 11,
wherein the processor is further configured to cause the memory to store the number of times the nozzle passes through the blade and the brush several times.

16. The three-dimensional shaping device according to claim 1, further comprising a sensor configured to detect a height of the blade or the brush,
wherein the processor is configured to specify a wear state of the cleaning mechanism based on a measurement result of the height of the blade or the brush based on the sensor.

17. The three-dimensional shaping device according to claim 1, wherein
the zigzag path includes a path for moving the nozzle along the first direction and a path for moving the nozzle along the second direction.

18. The three-dimensional shaping device according to claim 1, wherein
the zigzag path includes a path for moving the nozzle along the first direction while moving the nozzle from the side of the blade toward the side of the brush, or from the side of the brush toward the side of the blade.

* * * * *